US012783800B2

(12) United States Patent
El Asri et al.

(10) Patent No.: US 12,783,800 B2
(45) Date of Patent: Nov. 3, 2026

(54) SYSTEM AND METHOD FOR NATURAL LANGUAGE PROCESSING WITH PRETRAINED LANGUAGE MODELS

(71) Applicant: ROYAL BANK OF CANADA, Toronto (CA)

(72) Inventors: Layla El Asri, Montreal (CA); Aishik Chakraborty, Montreal (CA); Seyed Mehran Kazemi, Montreal (CA)

(73) Assignee: ROYAL BANK OF CANADA, Toronto (CA)

( * ) Notice: Subject to any disclaimer, the term of this patent is extended or adjusted under 35 U.S.C. 154(b) by 741 days.

(21) Appl. No.: 17/583,398

(22) Filed: Jan. 25, 2022

(65) Prior Publication Data

US 2022/0237378 A1 Jul. 28, 2022

Related U.S. Application Data

(60) Provisional application No. 63/141,107, filed on Jan. 25, 2021.

(51) Int. Cl.

| | |
|---|---|
| ***G06N 20/00*** | (2019.01) |
| ***G06F 40/205*** | (2020.01) |
| ***G06F 40/284*** | (2020.01) |
| ***G06F 40/295*** | (2020.01) |

(52) U.S. Cl.

CPC .......... *G06F 40/284* (2020.01); *G06F 40/205* (2020.01); *G06F 40/295* (2020.01); *G06N 20/00* (2019.01)

(58) Field of Classification Search

CPC .... G06F 40/284; G06F 40/395; G06F 40/205; G06N 20/00

See application file for complete search history.

(56) References Cited

U.S. PATENT DOCUMENTS

| | | | | |
|---|---|---|---|---|
| 2020/0057946 | A1* | 2/2020 | Singaraju | G06N 5/022 |
| 2020/0311798 | A1* | 10/2020 | Forsyth | G06N 3/04 |
| 2021/0365640 | A1* | 11/2021 | Kang | G06F 18/214 |
| 2021/0383067 | A1* | 12/2021 | Reisswig | G06F 16/367 |
| 2023/0044266 | A1* | 2/2023 | Nguyen | G06F 16/90335 |
| 2023/0076576 | A1* | 3/2023 | Nishida | G06F 40/35 |

* cited by examiner

*Primary Examiner* — Olujimi A Adesanya
*Assistant Examiner* — Ethan Daniel Kim
(74) *Attorney, Agent, or Firm* — NORTON ROSE FULBRIGHT CANADA LLP

(57) ABSTRACT

A computer-implemented system and method and for learning an entity-independent representation are disclosed. The method may include: receiving an input text; identifying named entities in the input text; replacing the named entities in the input text with entity markers; parsing the input text into a plurality of tokens; generating a plurality of token embeddings based on the plurality of tokens; generating a plurality of positional embeddings based on the respective position of each of the plurality of tokens within the input text; generating a plurality of token type embeddings based on the plurality of tokens and the one or more named entities in the input text; and processing the plurality of token embeddings, the plurality of positional embeddings, and the plurality of token type embeddings using a transformer neural network model to generate a hidden state vector for each of the plurality of tokens in the input text.

29 Claims, 8 Drawing Sheets

400

| Models | Dev perplexity |
| --- | --- |
| RoBERTa | 235.67 |
| RoBERTa finetuned | 7.9 |
| EI-RoBERTa | 16.1 |

FIG. 4A

420

| Models | Dev Acc | Unseen Acc |
| --- | --- | --- |
| RoBERTa | 68.72 | 53.45 |
| RoBERTa finetuned | 69.4 | 55.98 |
| EI-RoBERTa | 69.7 | **69.7** |

FIG. 4B

430

| Models | Replaced Ent. Test |
|---|---|
| RoBERTa | 96.32 |
| RoBERTA-finetuned | 95.27 |
| EI-RoBERTa | **96.81** |

FIG. 4C

450

| Models | SNLI Test | Name Changed Acc | Role Switched Acc |
|---|---|---|---|
| BERT | 88.54 | 84.57 | 50.12 |
| RoBERTa | **90.98** | 84.71 | 50.11 |
| RoBERTa finetuned | 90.82 | **85.83** | 50.15 |
| EI-RoBERTa | 90.11 | 80.72 | **50.16** |

FIG. 4D

SYSTEM AND METHOD FOR NATURAL LANGUAGE PROCESSING WITH PRETRAINED LANGUAGE MODELS

CROSS-REFERENCE TO RELATED APPLICATION

This application claims priority to and benefits of U.S. Provisional Patent Application No. 63/141,107, filed on Jan. 25, 2021, the entire content of which is herein incorporated by reference.

FIELD

Embodiments described herein relate to the field of natural language processing, and in particular, to systems and methods for training and improving one or more language models.

BACKGROUND

Pretrained Language Models (LMs) have been shown to have unmatched performance in a wide range of NLP tasks. However, these LMs could make incorrect predictions when some small perturbations are performed on input entities. Such small perturbations may include, for example, swapping a named entity (which may be referred to as simply "entity" throughout the disclosure herein) with a different named entity of the same class.

Named entities, in language models, refer to names representing real world objects, such as a person, location, organization, brand, product, and so on. For example, a name of a person (e.g., "John" or "John Lee") can be a named entity. For example, a name of a geographical region, such as New York City, can be another named entity. For yet another example, "Microsoft", name of a brand, can also be a named entity.

Generally speaking, named entities can be classified into one of several categories or classes: person, location, organization, and so on. The named entities "James" and "Mary" both belong to the same class: i.e., a person or a person's name. The named entity "Toronto" belongs to a different class: i.e., location.

With existing pretrained language models, the performance may be negatively affected when a named entity is swapped with a different named entity in a given input text, even if both named entities belong to the same class.

SUMMARY

In accordance with an aspect, there is provided a computer-implemented method for learning an entity-independent representation, the method comprising: receiving an input text; identifying one or more named entities in the input text; replacing the identified one or more named entities in the input text with one or more entity markers, each of the one or more entity markers corresponding to a respective named entity in the one or more identified named entities; parsing the input text including the one or more entity markers into a plurality of tokens; generating a plurality of token embeddings based on the plurality of tokens; generating a plurality of positional embeddings based on the respective position of each of the plurality of tokens within the input text; generating a plurality of token type embeddings based on the plurality of tokens and the one or more named entities in the input text; and processing the plurality of token embeddings, the plurality of positional embeddings, and the plurality of token type embeddings using a transformer neural network model ("the transformer model") to generate a hidden state vector for each of the plurality of tokens in the input text.

In some embodiments, each token embedding for a respective token in the plurality of tokens includes a vector representation of fixed dimensions for the respective token.

In some embodiments, when a token in the plurality of tokens is not a named entity, the corresponding token type embedding has a first type value; wherein when a token in the plurality of tokens is a named entity, the corresponding token type embedding has a type value that is different from the first type value; and each unique named entity within the plurality of tokens has a unique type value for the corresponding token type embedding.

In some embodiments, the input text comprises a sentence and each token has a word in the sentence.

In some embodiments, parsing the input text into the plurality of tokens includes: adding a first token representing a beginning of the sentence before a first word of the sentence; adding a second token representing an end of the sentence after a last word of the sentence; and generating the plurality of tokens including the first token and the second token.

In some embodiments, the transformer model has an encoder block, the encoder block having a plurality of layers, and each of the plurality of layers has a multi-head self-attention mechanism and a feed forward network.

In some embodiments, the transformer model is trained based on a masked language modeling to predict masked words in an input sentence.

In some embodiments, the transformer model is trained to optimize a consistency loss $L_c$.

In some embodiments, the consistency loss $L_c$ is based on:

$$L_c=(\mathrm{KL}(P\|Q)+\mathrm{KL}(Q\|P))/2,$$

where P is a probability distribution over a vocabulary during a forward pass on a training sentence, Q is a probability distribution over the vocabulary during a forward pass on a sentence based on the training sentence with entities in the training sentence replaced with entity markers, and KL is a Kullback-Leibler divergence.

In some embodiments, the transformer model is trained to optimize a semantics loss $L_{sem}$.

In some embodiments, the semantics loss $L_{sem}$ is based on:

$$L_{sem}=\mathrm{MSE}(S1_{CLS},S2_{CLS}),$$

where $S1_{CLS}$ represents a last layer output of the transformer model corresponding to a CLS token for a training sentence, $S2_{CLS}$ represents a last layer output of the transformer model corresponding to a CLS token for a sentence based on the training sentence with entities in the training sentence replaced with entity markers, and MSE is the Mean Squared Error Loss.

In some embodiments, the transformer model is trained to optimize an overall loss based on:

$$L_t=\alpha(\mathrm{MLM}(S1)+\mathrm{MLM}(S2))+\beta L_c+\gamma L_{sem}$$

where α, β and γ are hyperparameters, S1 is a training sentence, $L_c$ is a consistency loss, $L_{sem}$ is a semantics loss, and MLM is a masked language modeling loss.

In some embodiments, the transformer model is trained on a commonsense reasoning downstream task.

In some embodiments, the transformer model is trained on a sentiment analysis downstream task.

In accordance with another aspect, there is provided a computer system for learning an entity-independent representation, the system may include a processor and a memory in communication with the processor, the memory storing instructions that when executed, cause the processor to perform: receive an input text; identify one or more named entities in the input text; replace the identified one or more named entities in the input text with one or more entity markers, each of the one or more entity markers corresponding to a respective named entity in the one or more identified named entities; parse the input text including the one or more entity markers into a plurality of tokens; generate a plurality of token embeddings based on the plurality of tokens; generate a plurality of positional embeddings based on the respective position of each of the plurality of tokens within the input text; generate a plurality of token type embeddings based on the plurality of tokens and the one or more named entities in the input text; and process the plurality of token embeddings, the plurality of positional embeddings, and the plurality of token type embeddings using a transformer neural network model ("the transformer model") to generate a hidden state vector for each of the plurality of tokens in the input text.

In some embodiments, each token embedding for a respective token in the plurality of tokens includes a vector representation of fixed dimensions for the respective token.

In some embodiments, when a token in the plurality of tokens is not a named entity, the corresponding token type embedding has a first type value; wherein when a token in the plurality of tokens is a named entity, the corresponding token type embedding has a type value that is different from the first type value; and each unique named entity within the plurality of tokens has a unique type value for the corresponding token type embedding.

In some embodiments, the input text comprises a sentence and each token has a word in the sentence.

In some embodiments, parsing the input text into the plurality of tokens includes: adding a first token representing a beginning of the sentence before a first word of the sentence; adding a second token representing an end of the sentence after a last word of the sentence; and generating the plurality of tokens including the first token and the second token.

In some embodiments, the transformer model has an encoder block, the encoder block having a plurality of layers, and each of the plurality of layers has a multi-head self-attention mechanism and a feed forward network.

In some embodiments, the transformer model is trained based on a masked language modeling to predict masked words in an input sentence.

In some embodiments, the transformer model is trained to optimize a consistency loss $L_c$.

In some embodiments, the consistency loss $L_c$ is based on:

$$L_c=(\mathrm{KL}(P\|Q)+\mathrm{KL}(Q\|P))/2,$$

where P is a probability distribution over a vocabulary during a forward pass on a training sentence, Q is a probability distribution over the vocabulary during a forward pass on a sentence based on the training sentence with entities in the training sentence replaced with entity markers, and KL is a Kullback-Leibler divergence.

In some embodiments, the transformer model is trained to optimize a semantics loss $L_{sem}$.

In some embodiments, the semantics loss $L_{sem}$ is based on:

$$L_{sem}=\mathrm{MSE}(S1_{CLS},S2_{CLS}),$$

where $S1_{CLS}$ represents a last layer output of the transformer model corresponding to a CLS token for a training sentence, $S2_{CLS}$ represents a last layer output of the transformer model corresponding to a CLS token for a sentence based on the training sentence with entities in the training sentence replaced with entity markers, and MSE is the Mean Squared Error Loss.

In some embodiments, the transformer model is trained to optimize an overall loss based on:

$$L_t=\alpha(\mathrm{MLM}(S1)+\mathrm{MLM}(S2))+\beta L_c+\gamma L_{sem}$$

where α, β and γ are hyperparameters, S1 is a training sentence, $L_c$ is a consistency loss, $L_{sem}$ is a semantics loss, and MLM is a masked language modeling loss.

In some embodiments, the transformer model is trained on a commonsense reasoning downstream task.

In some embodiments, the transformer model is trained on a sentiment analysis downstream task.

In accordance with yet another aspect, there is provided a non-transitory computer-readable medium having computer executable instructions stored thereon for execution by one or more computing devices, the instructions, when executed, cause the one or more computing devices to: receive an input text; identify one or more named entities in the input text; replace the identified one or more named entities in the input text with one or more entity markers, each of the one or more entity markers corresponding to a respective named entity in the one or more identified named entities; parse the input text including the one or more entity markers into a plurality of tokens; generate a plurality of token embeddings based on the plurality of tokens; generate a plurality of positional embeddings based on the respective position of each of the plurality of tokens within the input text; generate a plurality of token type embeddings based on the plurality of tokens and the one or more named entities in the input text; and process the plurality of token embeddings, the plurality of positional embeddings, and the plurality of token type embeddings using a transformer neural network model to generate a hidden state vector for each of the plurality of tokens in the input text.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the Figures which illustrate example embodiments,

FIG. 4A is a table of results for model complexity evaluated on a Winogrande development set, according to an embodiment.

FIG. 4B is a table of results for models evaluated on two Winogrande development sets, according to an embodiment.

FIG. 4C is a table of results for models evaluated on a Stanford Sentiment Treebank (SST) test set, according to an embodiment.

FIG. 4D is a table of results for models evaluated on a Stanford Natural Language Inference (SNLI) test set, according to an embodiment.

DETAILED DESCRIPTION

Figure 1:
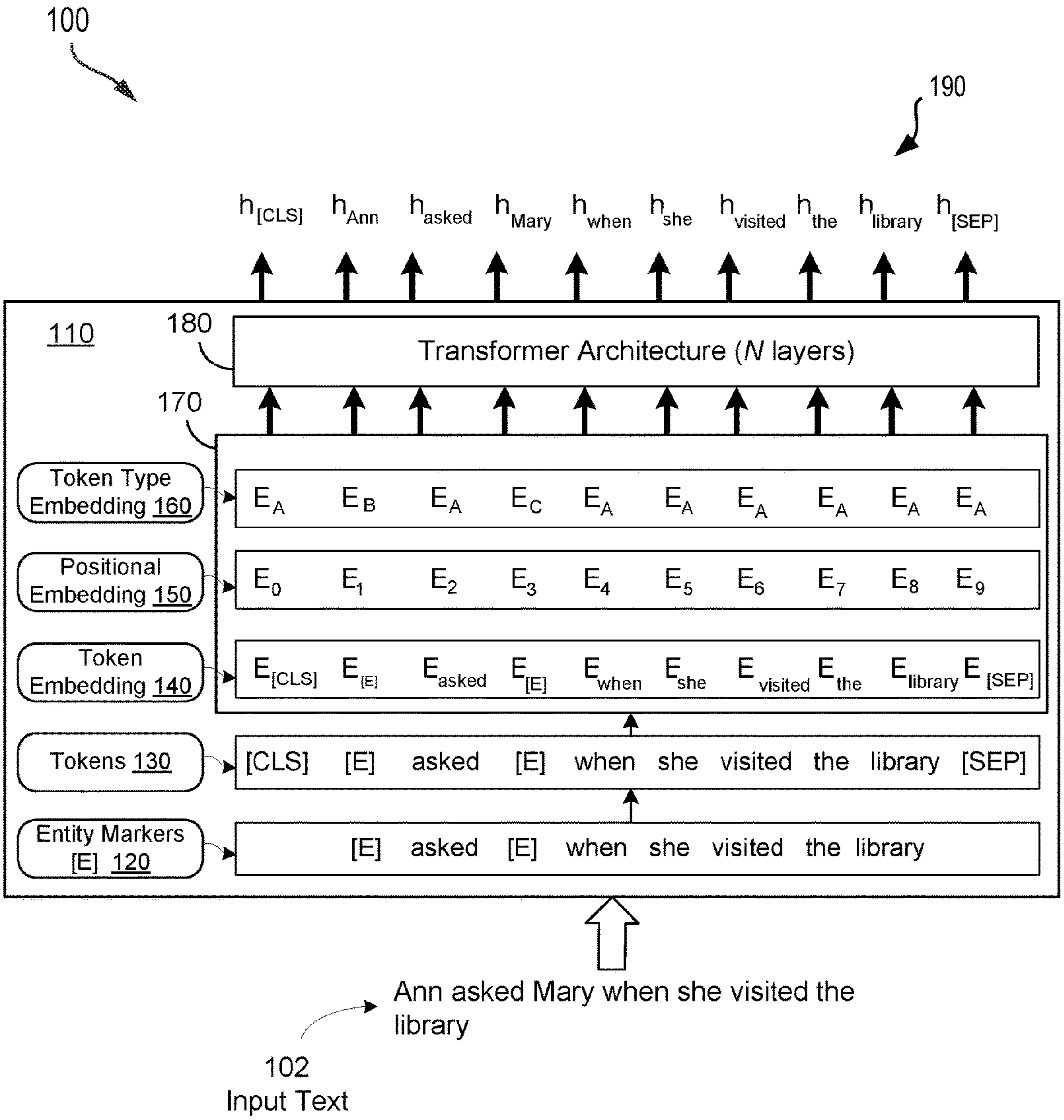
FIG. 1 illustrates a system for language modelling with an entity-independent language model, according to an embodiment.

Embodiments of methods, systems, and apparatus are described through reference to the drawings.

Traditional pretrained LMs learn different representations for each named entity (hereinafter simply "entity" or "entities") that they encounter, and not only for each entity, but each context in which they see this entity. Such models can rely too much on specific entities, and fail to generalize across entities. Thus, their predictions can vary widely from just changing an entity.

To address pretrained LMs making incorrect predictions when small perturbations are done to the input entities, embodiments disclosed herein augment existing pretrained LMs to learn entity independent representations. Instead of learning representations to represent one specific entity, representations can be learned to represent the concept of an entity, which may give more consistent results regardless of the entities in the sentence. At the same time, these representations may be robust to different perturbations and can also generalize to unseen entities. Experimental work shows that the embodiments of entity-independent models disclosed herein may be robust to some entity-specific biases that can influence downstream tasks. The improved robustness can provide higher accuracy in downstream tasks, such as predicting a masked word in a given sentence, or predicting a relationship between two given sentences.

The embodiments disclosed herein can accelerate the learning of pretrained language models. Typically, the learning process for language models is data and time intensive. By increasing the speed of learning, the computing resources (e.g., data and/or time) required for training the pretrained language model is reduced.

Deep pretrained transformer (Vaswani et al., 2017) based language models (LMs) are typically trained on large amounts of text. On virtually every downstream natural language processing (NLP) task, these pretrained models have state-of-the-art performance. Models like BERT (Devlin et al., 2018), RoBERTa (Liu et al., 2019) have replaced task-specific NLP models based on static embeddings like GloVe (Pennington et al., 2014). Even though the language models tend to outperform traditional task-specific models based on static embeddings, they still have shortcomings.

Recent work like Trichelair et al. (2018) have shown that pretrained LMs make incorrect predictions in the Winograd Schema Challenge (WSC) test set when the entities in the input sentence are swapped (in an example, a name "Anne" is replaced with the name "Emily"). The traditional way to solve this task is to show enough perturbations like entity swapping during training and train the language model to become as robust as possible to these perturbations (Sakaguchi et al., 2019).

In embodiments disclosed herein, an alternative way to learn input text including named entity representations is disclosed, that may be robust to entity swaps with less performance degradation in the model. To achieve this goal, entity markers are introduced that are used to learn entity-independent representations and auxiliary loss functions are implemented. The auxiliary loss functions have a component that tries to mimic the masked language modeling loss introduced in Devlin et al. (2018) as well as a component specifically designed for entity-swap robustness.

Contextual representations may be learned for entities by using token type embeddings. Embodiments of the entity-independent model as disclosed herein may be able to learn entity-independent representations that generalize across multiple tasks.

Recent work (Shwartz et al., 2020) has also shown that the entity representations learnt by pretrained language models can perpetuate unintentional biases. These biases can then propagate to downstream tasks used to finetune these pretrained models. Experimental work as described herein shows how embodiments of the entity-independent models can be robust to these unintentional biases.

Models for learning entity-independent representations, which can be entity-independent and can also be entity-specific are disclosed herein. Both types of language models are based on pretrained language models (LMs). Pretrained LMs like BERT (Devlin et al., 2018) or RoBERTa (Liu et al., 2019) are usually trained using the Masked Language Modeling (MLM) objective, which involves predicting a masked token given a sequence of tokens.

Embodiments disclosed herein can modify the MLM objective to learn entity-independent representations. In some embodiments, input tokens are embedded with entity markers and entity-specific token types to represent entities. Furthermore, one or more modified auxiliary losses can be used in conjunction with MLM losses to learn the token-type representations and the entity-marker representations.

FIG. 1 illustrates a system 100 for language modeling including an architecture of an entity-independent language model 110, that learns entity-independent representations, in an embodiment. In some embodiments, the language model 110 uses a transformer neural network model 180 (hereinafter the "transformer model 180") to process a plurality of input 170 to generate a plurality of hidden state vectors 190, which may be used for further language model training based one or more downstream tasks. The plurality of input 170 may be generated based on an input text 102, which may be a single sentence.

Input text 102 can be tokenized to be represented as tokens, for example, either a full word or part of a word. Each token may be presented by $E_{token}$, each token may include a unique value, which may be for example a unique numeric value, based on the word or string represented by the respective token, as further elaborated below.

The input text 102 may include one or more named entities. For example, the input text 102 may be "Ann asked Mary when she visited the library". Both Ann and Mary are named entities. Entities such as named persons in a sentence can be identified using, in an example, Named Entity Recognizer (NER) provided with the Stanza package (Qi et al., 2020).

Tokens can represent entities. An entity can be a person or thing. In particular, an entity can be a "named entity", in an example, names of people, countries, places, organizations, and the like, represented by proper nouns. A named entity can include, for example, a named person as discussed herein.

A specific type of token referred to as an entity marker 120 can be denoted by [E] or a different notation. Every entity, such as a person's name, in the input text 120 is replaced with this entity marker. In case an entity has more than one token (e.g., New York), all of the tokens are replaced with a single [E].

A reserved word in the RoBERTa vocabulary can be used to represent an entity marker, and therefore it may not be necessary to add any new tokens to the RoBERTa vocabulary, when the language model 110 is adapted to leverage the RoBERTa vocabulary.

Next, after each entity in the input text 102 has been replaced by an entity marker [E] 120, the original input text 102 "Ann asked Mary when she visited the library" become "[E] asked [E] when she visited the library".

In some embodiments, an input text may have different classes of entities, for example, "Ann asked Mary when she visited the New York Public Library." In this case, in addition to "Ann" and "Mary", "New York Public Library" is also a named entity. While "Ann" and "Mary" are entities belonging to a first class, e.g., person's names, "New York Public Library" is an entity belonging to a second class, e.g., physical buildings. In this case, a different entity marker [N] may be used to denote an entity for a different class, as compared to the first class. So the input text, after having replaced all entities with a respective entity marker, may read "[E] asked [E] when she visited the [N]".

The text "[E] asked [E] when she visited the library" can be then processed by a tokenizer process of the system 110. The tokenizer process may add a first token representing a beginning of the sentence before a first word of the sentence and a second token representing an end of the sentence after a last word of the sentence. For example, the tokenizer process may add a [CLS] token to the beginning of the sentence, and a [SEP] token to the end of the sentence. [CLS] may signal that the token immediately after [CLS] is the first token of the input text 102, while [SEP] may signal that the token immediately prior to [SEP] is the last token of the input text 102.

The tokenizer process can then generate a plurality of tokens 130 based on the sentence "[CLS] [E] asked [E] when she visited the library [SEP]". Each of the plurality of tokens 130 in this example embodiment includes, respectively: [CLS], [E], asked, [E], when, she, visited, the, library, [SEP]. In some embodiments, the tokenizer process may be a pretrained machine learning model specifically configured to recognize tokens in an input text. For instance, the tokenizer process may be a WordPiece tokenization process.

In some embodiments, a hidden state vector of the [CLS] token as generated by the transformer model 180 may be used to represent some meanings of the entire input text.

Each token 130 in the plurality of tokens 130 may include a unique numerical value determined based on a vocabulary database.

In some embodiments, each of the tokens 130 may be looked up in a pre-existing vocabulary database, such as, for example, a RoBERTa vocabulary database or dictionary to determine a unique numerical value for representation of the respective token. Each token 130 may correspond to a specific and unique numerical value, which may be, for example, an index in the vocabulary database, then the unique numerical may be taken as the value for the respective token 130. For example, the token $E_{when}$ for the word "when" may have a numerical value of 123 in the vocabulary database used; the token $E_{she}$ for the word "she" may have a numerical value of 256 in the vocabulary database used; and the token $E_{visited}$ for the word "visited" may have a numerical value of 102 in the vocabulary database used. The tokens "$E_{when}$ $E_{she}$ $E_{visited}$" (without the quotation marks) then have values "123 256 102" (without the quotation marks).

The system 110 may generate a plurality of token embeddings 140, each of which may be denoted by, respectively: $E_{[CLS]}$, $E_{[E]}$, $E_{asked}$, $E_{[E]}$, $E_{when}$, $E_{she}$, $E_{visited}$, $E_{the}$, $E_{library}$, $E_{[SEP]}$. In some embodiments, the tokens 130 are processed by the system 100 into token embeddings 140, each of which may include a vector representation of fixed dimensions, such as a 768-dimensional vector in Bidirectional Encoder Representations from Transformers (BERT).

The system 110 may generate a plurality of positional embeddings 150 based on a sequential position (e.g., from left to write in English) of each of the plurality of tokens 130. A positional embedding 150 for a given token 130 can be a numerical value used to determine a position of the given token 130 within the plurality of tokens 130. In the example tokens 130 shown in FIG. 1, the token [CLS] has a first position, which may be assigned a positional embedding $E_0$, the token first [E] has a second position, which may be assigned a positional embedding $E_1$, the token "asked" has a third position, which may be assigned a positional embedding $E_2$, the token second [E] has a fourth position, which may be assigned a positional embedding $E_3$, and so on. The positional embeddings 150 for the plurality of tokens 130 are therefore: $E_0$, $E_1$, $E_2$, $E_3$, $E_4$, $E_5$, $E_6$, $E_7$, $E_8$, $E_9$.

In some embodiments, each of the positional embeddings 150 may include a vector representation of fixed dimensions, such as a 768-dimensional vector in Bidirectional Encoder Representations from Transformers (BERT).

The system 110 may generate a plurality of token type embeddings 160 based on the plurality of tokens 130 and the original input text 102. The token type embeddings 160 can be used to distinguish between different named entities and between entities and non-entities in the plurality of tokens 130.

As described earlier, the entity marker [E] 120 provides a way for the model to identify entities. However, it may also be desirable to have a way to distinguish between different entities. Entities can be distinguished by adding entity-specific token type embeddings 160 to the existing token embeddings 140. For example, the RoBERTa model in Liu et al. (2019) utilizes token types to distinguish between the current sentence and the subsequent sentence in the scenario when there are two sentences. As there is only one sentence in the input text 102 to this model 110, the token types can be repurposed or augmented with entity-specific token types disclosed herein. This can be done by assigning a new token type to every unique entity. Thus, at the input layer of model 110, each entity [E] 120 has a unique type embedding 160.

For example, when a token in the plurality of tokens 130 is not a named entity, the corresponding token type embedding 160 can have a first type value; and when a token in the plurality of tokens 130 is a named entity, the corresponding token type embedding can have a type value that is different from the first type value. Furthermore, each unique named entity within the plurality of tokens 130 has a unique type value for the corresponding token type embedding 160.

As shown in FIG. 1, a first type value, $E_A$, for token type embedding 160 is assigned to tokens (e.g., [CLS], asked, etc.) that are not entities in the plurality of tokens 130. A second type value, $E_B$, for token type embedding 160 is assigned to the first entity marker token [E] which corresponds to the name Ann from the input text 102. A third type value, $E_C$, for token type embedding 160 is assigned to the second entity marker token [E] which corresponds to the name Mary from the input text 102. As Ann and Mary are different (or unique) entities, the respective value for the respective token type embedding 160 is also unique.

In some embodiments, when the input text 102 has a second named entity (e.g., New York) that is of a different class than the first named entity (e.g., Ann), the corresponding token type embedding 160 may have a type value to indicate that the second named entity belongs to a different class. For example, if the token "Ann" has a token type embedding 160 $E_B$, the token "New York" may have a respective token type embedding 160 $E_{DD}$.

The input 170 to the transformer architecture or transformer model 180 includes at least the plurality of token embeddings 140, the plurality of positional embeddings 150 and the plurality of token type embeddings 160. In some embodiments, the plurality of token embeddings 140, the plurality of positional embeddings 150 and the plurality of token type embeddings 160 may be vectors of fixed dimensions, and the input 170 may include a sum of the plurality of token embeddings 140, the plurality of positional embeddings 150 and the plurality of token type embeddings 160. In some embodiments, the plurality of tokens 130 is also input to the transformer model 180.

The transformer architecture or transformer model 180 of N layers is used to process the input 170 and generate a plurality of hidden state vectors 190: $h_{[CLS]}$, $h_{Ann}$, $h_{asked}$, $h_{Mary}$, $h_{when}$, $h_{she}$, $h_{visited}$, $h_{the}$, $h_{library}$, $h_{[SEP]}$. Each of these hidden state vector 190 may correspond to a respective token in the plurality of tokens 130.

Figure 2:
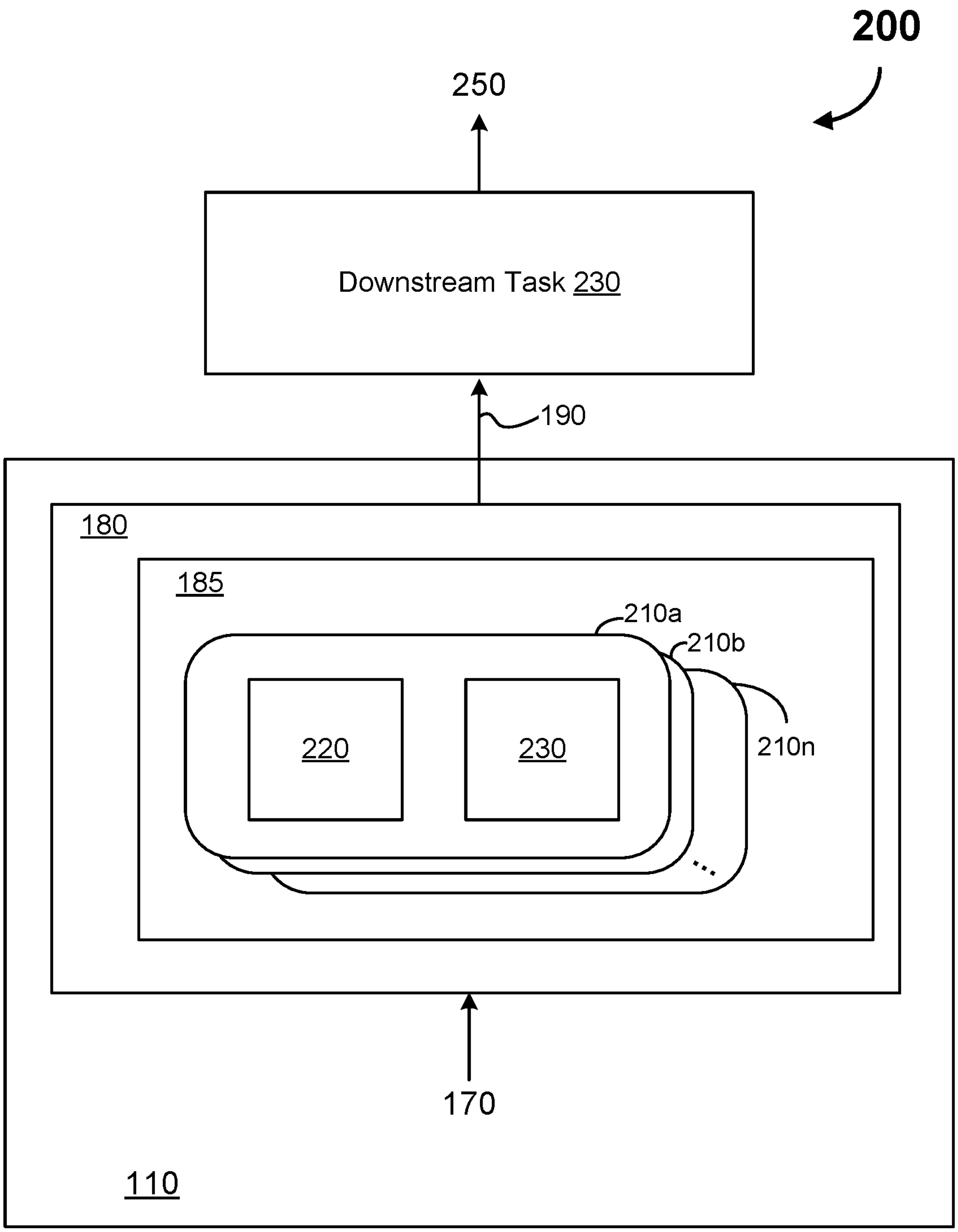
FIG. 2 illustrates a system for language modelling with an entity-independent language model configured for a downstream task, according to an embodiment.

FIG. 2 shows an example system 200 for language modelling with an entity-independent language model 110 configured for a downstream task 230, according to some embodiments. The downstream task 230 may include further machine learning models configured to fine-tune or optimize the entity-independent language model 110 based on the plurality of hidden state vectors 190. The output 250 from the downstream task 230 may be a prediction value, a probability value, or any other suitable value depending on the type of the downstream task 230, which is elaborated further below.

In some embodiments, the output 250 may be further provided to an output device, which may be for example, a display monitor or a speaker circuit, to show the prediction result generated by the language model 110 based on at least an input text.

For example, the language model 110, once trained and finetuned using the embodiments disclosed herein, may receive part of a sentence and predict the next word, which is the output 250. In some embodiments, a smartphone keyboard may use the language model 110 to suggest the next word based on what a user has already typed into the input field.

In some embodiments, the transformer model 180 may be referred to as "Entity Independent RoBERTa" or "EI-RoBERTa", as it may use a similar transformer architecture of N layers as used by the RoBERTa model.

In some embodiments, the transformer model 180 may include an encoder block 185, the encoder block 185 having a plurality of N layers 210*a*, 210*b* . . . 210*n*. Each layer 210*a*, 210*b*, 210*n* may have a multi-head self-attention mechanism 220 and a feed forward network 230. The first layer 210*a* is configured to process the input 170 (e.g., sum of the plurality of token embeddings 140, the plurality of positional embeddings 150 and the plurality of token type embeddings 160) and generate an output. Then each of the subsequent layers 210*b* . . . 210*n* is configured to process the output from the previous layer, iteratively one layer after another.

Figure 3:
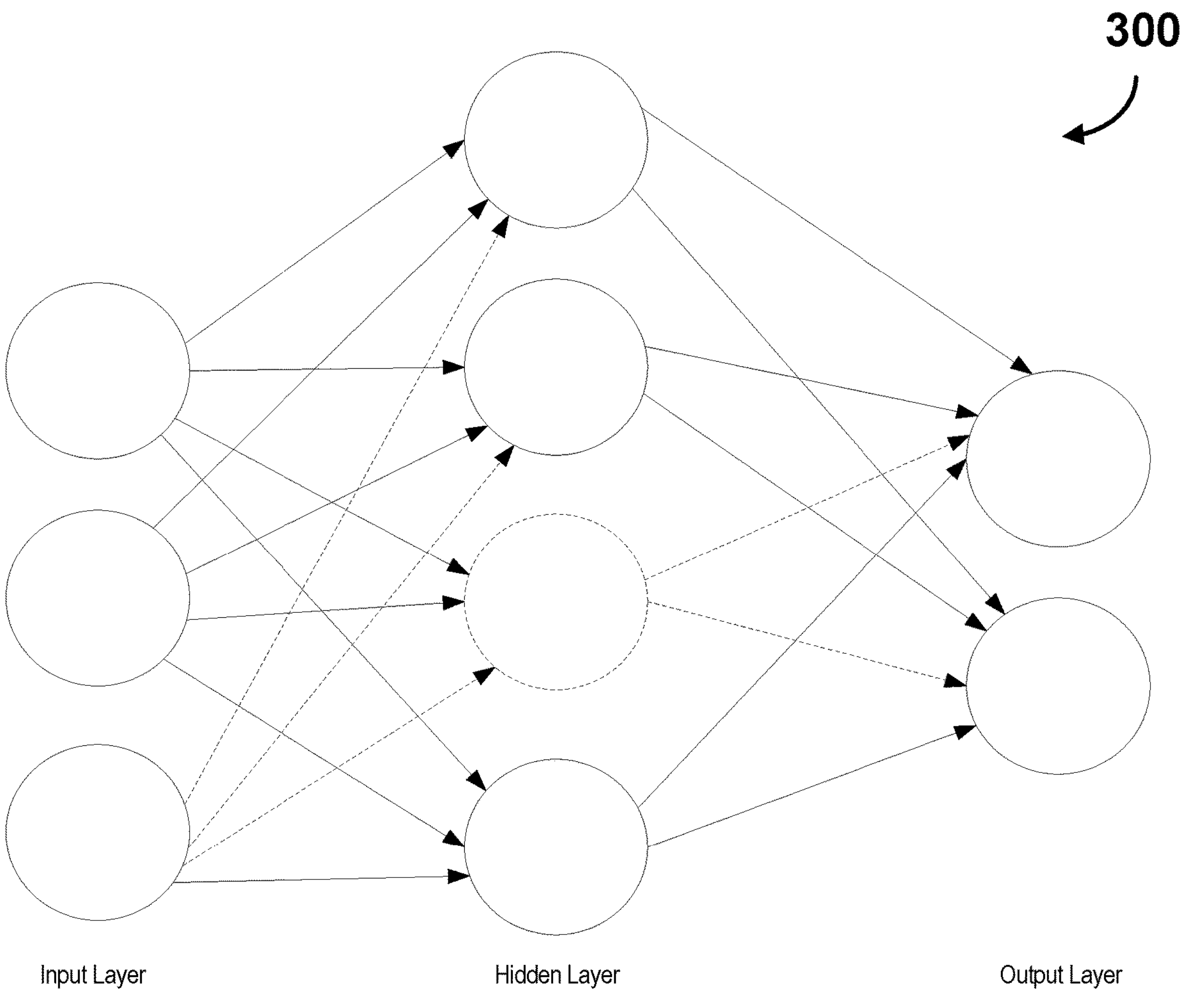
FIG. 3 is a schematic diagram of an example neural network implemented by the system in FIG. 2.

FIG. 3 is a schematic diagram of an example neural network 300 that may be used to implement the feed forward network 230, according to some embodiments. The example neural network 300 can include an input layer, a hidden layer, and an output layer. The neural network 300 processes input data using its layers based on weights, for example.

In some embodiments, the transformer model 180 may further include a decoder block (not shown). In some embodiments, a decoder block may include three components: a self-attention mechanism, an attention mechanism over the encodings, and a feed-forward neural network.

Downstream Task and Optimization Objective

In order to optimize the language model 110, a masked language modeling to predict masked words in an input sentence may be implemented as a downstream task 230. A loss function is implemented herein to learn positive representations for the entity markers 120 and the token type embeddings 160. Considering the following example during training:

S1: Ann asked Mary what time the library [MASK], because she had forgotten.

S2: [E] asked [E] what time the library [MASK], because she had forgotten.

In the example above, S1 is a possible training example and S2 is the same sentence with the entities replaced with the entity markers [E]. A goal is to make sure that the masked token, denoted by [MASK], is predicted correctly by the language model 110 regardless of the entities provided to the model 110.

A new loss function may be applied to achieve similar probability distributions over a given vocabulary at the [MASK] location for both sentences S1 and S2. Let the probability distribution over the given vocabulary during a forward pass on S1 be P, and the probability distribution over the vocabulary during a forward pass on S2 be Q, a consistency loss can be defined as:

$$L_c=(\mathrm{KL}(P\|Q)+\mathrm{KL}(Q\|P))/2, \tag{1}$$

where KL is the Kullback-Leibler divergence.

A given vocabulary may be an existing vocabulary database, such as a RoBERTa vocabulary. A forward pass is a pass of input (e.g., S1 or S2) through the transformer model 180 in one iteration or round.

Furthermore, replacing an entity by the corresponding entity markers [E] may preserve other linguistic properties of the original sentence such as the general sentiment of the sentence, its syntactic structure, and so on. Therefore, a special loss is added to preserve the semantics between S1 and S2.

In addition, to assure that other linguistic properties of the original sentence, including for example, a general sentiment of the sentence, its syntactic structure, and so on are preserved despite replacing an entity by the corresponding entity marker [E], a special loss may be added to preserve the semantics between S1 and S2.

Let $S1_{CLS}$ represent an output from the last layer of the encoder block of the transformer model 180 corresponding to the [CLS] token for S1, and let $S2_{CLS}$ represent an output from the last layer of the encoder block of the transformer model 180 corresponding to the [CLS] token for S2, a loss to preserve semantics between S1 and S2 can be defined by:

$$L_{sem}=\mathrm{MSE}(S1_{CLS},S2_{CLS}), \tag{2}$$

where MSE is the Mean Squared Error Loss.

In some embodiments, $S1_{CLS}$ is equivalent to $h_{[CLS]}$ from FIG. 1 when the input text 102 received by the system 110 is S1.

The optimized final loss is:

$$L_t=\alpha(\text{MLM}(S1)+\text{MLM}(S2))+\beta L_c+\gamma L_{sem} \quad (3)$$

where α, β and γ are hyperparameters, and MLM is the masked language modeling loss.

Datasets and Tasks

Training Dataset

In some embodiments, the language model 110 is trained on the WikiText-2 dataset. This dataset contains 2 million tokens in the training data.

In some embodiments, a Named Entity Recognizer (NER) provided with the Stanza package (Qi et al., 2020) can be used to extract named entities. Named entities of type PERSON, in an example, can be extracted and assigned token type ids to each unique named entity per sentence.

The maximum number of entities of type PERSON possible per sentence may be set to 10. If a sentence has more than 10 named entities of type PERSON, it is removed from the training set. If there is only one named entity of type PERSON in a sentence, then the token type embedding 160 may be randomly assigned.

Commonsense Reasoning

One of the downstream tasks 230 that the language model 110 can be trained on is a Commonsense Reasoning task. One of the most popular datasets to test commonsense reasoning capabilities is Winogrande (Sakaguchi et al., 2019). The Winogrande task contains a sentence with a blank field, and two options for the blank field with one correct answer. The language model 110, after being finetuned by the Commonsense Reasoning task, is responsible for predicting what the correct answer is for the blanked token.

Natural Language Inference

Another downstream task 230 that the language model 110 can be trained on is natural language inference. For this task, the Stanford Natural Language Inference (SNLI) dataset (Bowman et al., 2015) can be used.

The natural language inference task includes reading a premise and labeling a hypothesis as either entailed by the premise, in contradiction with the premise, or neutral with respect to the premise. For instance, the hypothesis "Some men are playing a sport" is entailed by the premise "A soccer game with multiple males playing".

The language model 110 can be tested on the original test set of SNLI as well as the two test sets proposed by Mitra et al. (2019). The first test set named "Named Change" contains premises with one named entity and hypotheses which are similar to the premises except that the named entity is changed. For instance, a premise is "John went to the kitchen" and the corresponding hypothesis is "Peter went to the kitchen". A properly trained language model 110 should label this hypothesis as contradictory. The second test set named "Role Switched" contains premises with two entities and hypotheses that are similar to the premises except that the entities are switched. For example, a premise is "Kendall lent Peyton a bicycle" and the corresponding hypothesis is "Peyton lent Kendall a bicycle". Again, the correct label is contradiction. These test sets are configured to test whether models trained on the SNLI training dataset understood the role of entities.

Sentiment Analysis

Another downstream task 230 that the language model 110 can be trained on is sentiment analysis. For this task, the Stanford sentiment treebank dataset can be used. The model used can be similar to Liu et al. (2019). Sentiment analysis can be used to classify a sentiment of a sentence as "positive" or "negative".

Results

In experimental work, the Winogrande dataset has been used to evaluate the commonsense reasoning capabilities of model 110 as a pretrained LM. FIG. 4A is a table of results for model complexity evaluated on the Winogrande development set, according to an embodiment.

FIG. 4B is a table of results for models evaluated on two Winogrande development sets, the original one as well as a development set containing only entities that were not included in the training set, according to an embodiment. From the results illustrated in the table of FIG. 4B, it can be seen that the language model 110 has a similar performance to the RoBERTa model finetuned on WikiText-2.

To test the generalization capabilities of the LMs to unseen entities, another development set is created, where the entities in the development set are never seen during training. The result was a decrease in performance for both RoBERTa and RoBERTa finetuned on WikiText2. However, performance of the language model 110 does not change. This may be attributed to the fact that model 110 learns entity-independent representations as opposed to RoBERTa, which learns separate representations for each entity.

An embodiment of the language model 110 was also tested on the sentiment classification task with the Stanford Sentiment Treebank to test the language model 110. A separate test set was created where the first entity of each sentence was replaced with the token "Trump". This was done to determine if entity representations extracted from pretrained LMs have some inherent bias that influences the sentiment classification.

FIG. 4C illustrates models evaluated on a modified sentiment analysis test set, such as Stanford Sentiment Treebank (SST) test set. In testing, the performance of both RoBERTa and RoBERTa finetuned models drops on the test set with entities replaced with "Trump". This suggests that the entity representations are influencing the final sentiment classification for these models. The language model 110 (e.g., EI-RoBERTa) performs better than the RoBERTa baseline models on the test set with replaced entities. This is suggestive of the fact that, through the entity markers and token type embeddings, the language model 110 is able to learn entity-independent representations and therefore the entity representations do not tend to influence the sentiment classification predictions.

FIG. 4D illustrates models evaluated on SNLI test set. On SNLI, as shown in FIG. 4D, the language model 110 performs at a similar level as other models on the modified test sets. The performance of the language model 110 may be due to not having seen examples of this type in the training data, rather than not understanding entities. Further experiments have been performed to test this hypothesis where, during training, examples are progressively added from the modified training sets. The language model 110 is expected to learn to generalize to examples in the test sets with fewer training samples than BERT or RoBERTa.

Conveniently, existing language models can be augmented using embodiments herein to learn entity-independent representations. As shown in testing described above, embodiments of an entity-independent language model can generalize to unseen entities on the Winogrande task. Further, embodiments of an entity-independent language model may rely less on the identity of the entities while doing sentiment classification.

Figure 5A:
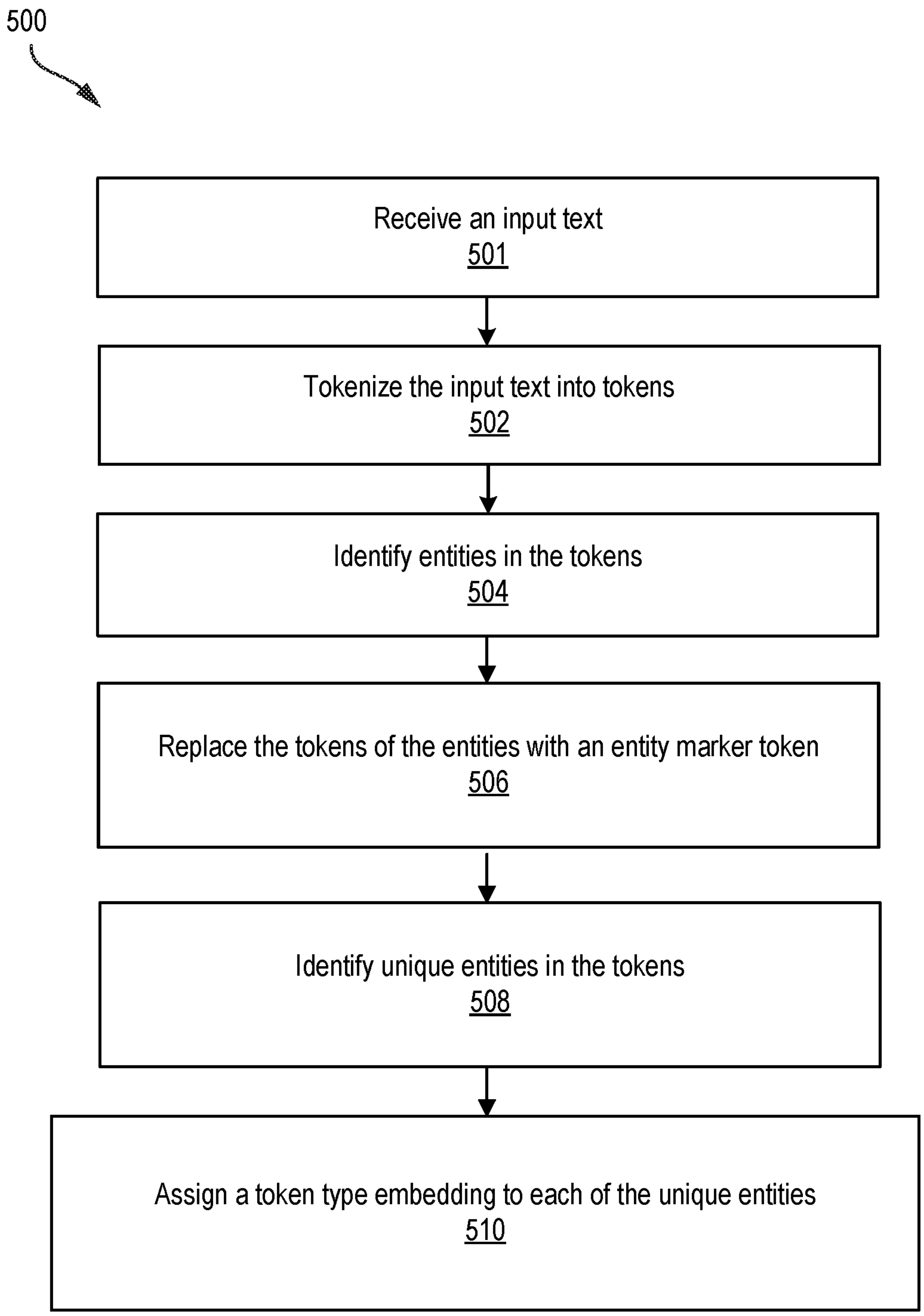
FIG. 5A is a flow chart of a first computer-implemented method for learning an entity-independent representations, according to an embodiment.

FIG. 5A illustrates an embodiment of a method 500 for learning an entity-independent representation using entity-independent language model 110. The steps or blocks are provided for illustrative purposes. Variations of the steps, omission or substitution of various steps, or additional steps may be considered. It should be understood that one or more of the blocks may be performed in a different sequence or in an interleaved or iterative manner.

At block 501, an input text is received. The input text may be a sentence having a plurality of words.

At block 502, input text is tokenized into a plurality of tokens, for example, either a full word or part of a word. Each token may be presented by Etoken, each token may include a unique value, which may be for example a unique numeric value, based on the word or string represented by the respective token, as further elaborated below.

At block 504, entities in the plurality of tokens are identified. Entities such as named persons in a sentence can be identified using, in an example, Named Entity Recognizer (NER) provided with the Stanza package (Qi et al., 2020).

At block 506, the tokens of the entities are replaced with an entity marker token. A specific type of token referred to as an entity marker can be denoted by [E] or a different notation. Every entity, such as a person's name, in the input text 120 is replaced with this entity marker. In case an entity has more than one token (e.g., New York), all of the tokens are replaced with a single [E].

At block 508, unique entities in the plurality of tokens are identified. A unique entity means an entity that is different from the other entities.

At block 510, a token type embedding is assigned to each of the unique entities. For example, when a token in the plurality of tokens is not a named entity, the corresponding token type embedding can have a first type value; and when a token in the plurality of tokens is a named entity, the corresponding token type embedding can have a type value that is different from the first type value. Furthermore, each unique named entity within the plurality of tokens has a unique type value for the corresponding token type embedding.

In some embodiments, the language model 110 is trained to a masked language modeling objective to predict masked words in a sentence.

In some embodiments, the language model 110 is trained to optimize a consistency loss $L_c$.

In some embodiments, the consistency loss $L_c$ is based on:

$$L_c=(\mathrm{KL}(P\|Q)+\mathrm{KL}(Q\|P))/2,$$

where P is a probability distribution over a given vocabulary during a forward pass on a training sentence, Q is a probability distribution over the vocabulary during a forward pass on a sentence based on the training sentence with entities replaced with entity markers, and KL is a Kullback-Leibler divergence.

In some embodiments, the language model 110 is trained to optimize a semantics loss $L_{sem}$.

In some embodiments, the semantics loss $L_{sem}$ is based on:

$$L_{sem}=\mathrm{MSE}(S1_{CLS},S2_{CLS}),$$

where $S1_{CLS}$ represents a last layer output of the transformer model corresponding to a CLS token for a training sentence, $S2_{CLS}$ represents a last layer output of the transformer model corresponding to a CLS token for a sentence based on the training sentence with entities replaced with entity markers, and MSE is the Mean Squared Error Loss.

In some embodiments, the language model 110 is trained to optimize an overall loss based on:

$$L_t=\alpha(\mathrm{MLM}(S1)+\mathrm{MLM}(S2))+\beta L_c+\gamma L_{sem}$$

where α, β and γ are hyperparameters, S1 is a training sentence, $L_c$ is a consistency loss, $L_{sem}$ is a semantics loss, and MLM is a masked language modeling loss.

In some embodiments, model 110 is trained on a commonsense reasoning downstream task.

In some embodiments, model 110 is trained on a sentiment analysis downstream task.

In some embodiments, words in an input sentence can be predicted using model 110.

Figure 5B:
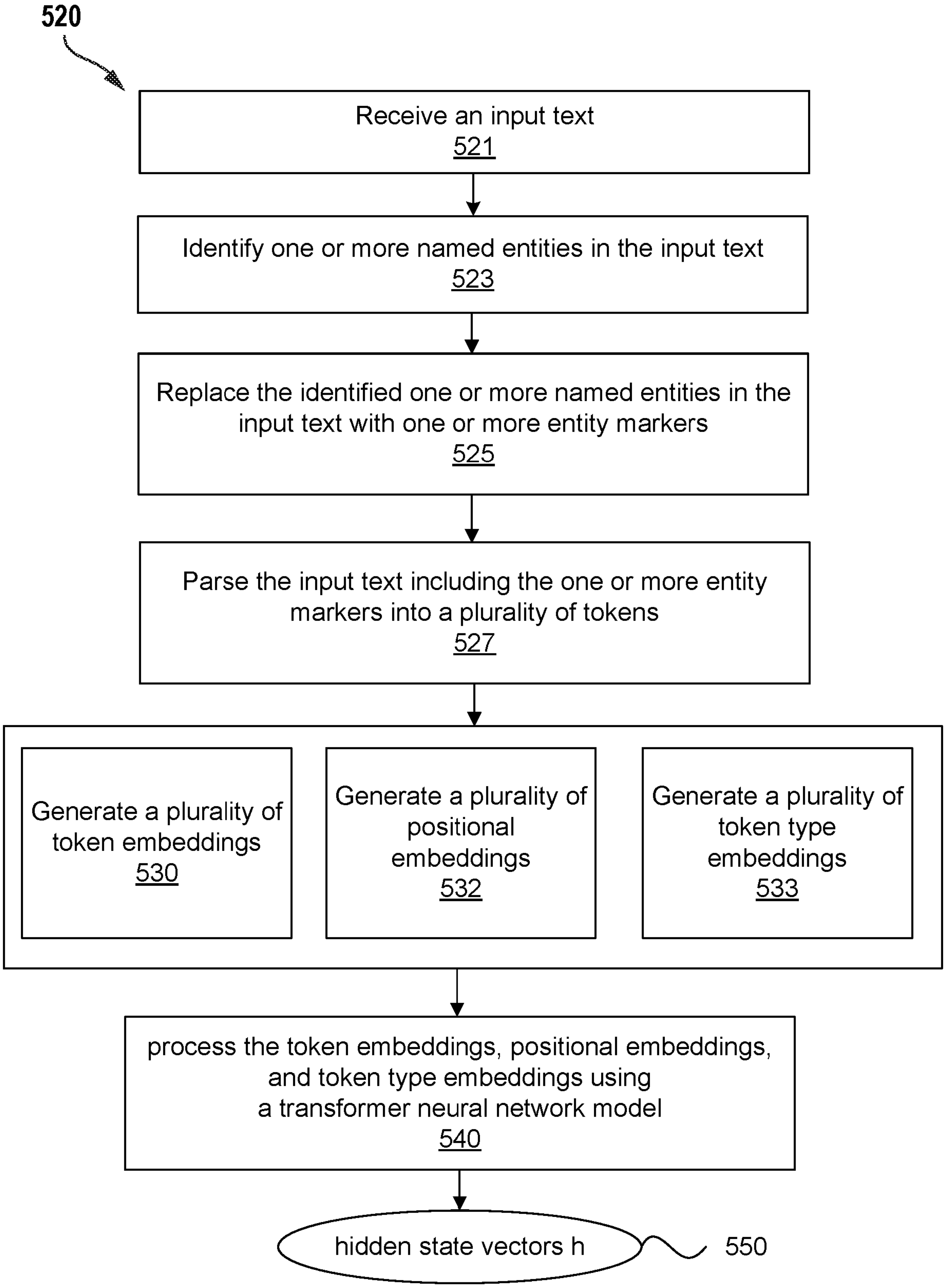
FIG. 5B is a flow chart of a second computer-implemented method for learning an entity-independent representations, according to an embodiment.

FIG. 5B illustrates an embodiment of a another computer-implemented method 520 for learning an entity-independent representation using entity-independent language model 110. The method 520 may be performed by system 100 or 200. The steps or blocks are provided for illustrative purposes. Variations of the steps, omission or substitution of various steps, or additional steps may be considered. It should be understood that one or more of the blocks may be performed in a different sequence or in an interleaved or iterative manner.

At block 521, the system 100 may receive an input text 102. In some embodiments, the input text 102 is a sentence and each token is a word in the sentence. For example, the input text 102 may be "Ann asked Mary when she visited the library".

At block 523, the system 100, 200 may identify one or more named entities in the input text. The input text 102 may include one or more named entities. Both Ann and Mary are named entities in the input text 102 "Ann asked Mary when she visited the library". Entities such as named persons in a sentence can be identified using, in an example, Named Entity Recognizer (NER) provided with the Stanza package (Qi et al., 2020).

At block 525, the system 100, 200 may replace the identified one or more named entities in the input text 102 with one or more entity markers 120, each of the one or more entity markers 120 corresponding to a respective named entity in the one or more identified named entities.

An entity marker 120 can be denoted by [E] or a different notation. Every entity, such as a person's name, in the input text 120 is replaced with this entity marker. In case an entity has more than one token (e.g., New York), all of the tokens are replaced with a single [E].

After each entity in the input text 102 has been replaced by an entity marker [E] 120, the original input text 102 "Ann asked Mary when she visited the library" become "[E] asked [E] when she visited the library".

At block 527, the system 100, 200 may parse the input text 102 including the one or more entity markers [E] into a plurality of tokens 130. Each token may be presented by Etoken, each token may include a unique value, which may be for example a unique numeric value, based on the word or string represented by the respective token.

The text "[E] asked [E] when she visited the library" can be then processed by a tokenizer process of the system 100, 200. The tokenizer process may add a first token representing a beginning of the sentence before a first word of the sentence and a second token representing an end of the sentence after a last word of the sentence. For example, the tokenizer process may add a [CLS] token to the beginning of the sentence, and a [SEP] token to the end of the sentence. [CLS] may signal that the token immediately after [CLS] is the first token of the input text 102, while [SEP] may signal that the token immediately prior to [SEP] is the last token of the input text 102.

The tokenizer process can then generate a plurality of tokens 130 based on the sentence "[CLS] [E] asked [E] when she visited the library [SEP]". Each of the plurality of tokens 130 in this example embodiment includes, respectively: [CLS], [E], asked, [E], when, she, visited, the, library, [SEP]. In some embodiments, the tokenizer process may be a pretrained machine learning model specifically configured to recognize tokens in an input text. For instance, the tokenizer process may be a WordPiece tokenization process.

In some embodiments, each of the tokens 130 may be looked up in a pre-existing vocabulary database, such as, for example, a RoBERTa vocabulary database or dictionary to determine a unique numerical value for representation of the respective token. Each token 130 may correspond to a specific and unique numerical value, which may be, for example, an index in the vocabulary database, then the unique numerical may be taken as the value for the respective token 130. For example, the token $E_{when}$ for the word "when" may have a numerical value of 123 in the vocabulary database used; the token $E_{she}$ for the word "she" may have a numerical value of 256 in the vocabulary database used; and the token $E_{visited}$ for the word "visited" may have a numerical value of 102 in the vocabulary database used. The tokens "$E_{when}$ $E_{she}$ $E_{visited}$" (without the quotation marks) then have values "123 256 102" (without the quotation marks).

At block 530, the system 100, 200 may generate a plurality of token embeddings 140 based on the plurality of tokens 130. Each of the plurality of token embeddings 140 may be denoted by, respectively: $E_{[CLS]}$, $E_{[E]}$, $E_{asked}$, $E_{[E]}$, $E_{when}$, $E_{she}$, $E_{visited}$, $E_{the}$, $E_{library}$, $E_{[SEP]}$. In some embodiments, the tokens 130 are processed by the system 100 into token embeddings 140, each of which may include a vector representation of fixed dimensions, such as a 768-dimensional vector in Bidirectional Encoder Representations from Transformers (BERT).

At block 532, the system 100, 200 may generate a plurality of positional embeddings 150 based on the respective position of each of the plurality of tokens 130.

A positional embedding 150 for a given token 130 can be a numerical value used to determine a position of the given token 130 within the plurality of tokens 130. In the example tokens 130 shown in FIG. 1, the token [CLS] has a first position, which may be assigned a positional embedding $E_0$, the token first [E] has a second position, which may be assigned a positional embedding $E_1$, the token "asked" has a third position, which may be assigned a positional embedding $E_2$, the token second [E] has a fourth position, which may be assigned a positional embedding $E_3$, and so on. The positional embeddings 150 for the plurality of tokens 130 are therefore: $E_0$, $E_1$, $E_2$, $E_3$, $E_4$, $E_5$, $E_6$, $E_7$, $E_8$, $E_9$.

In some embodiments, each of the positional embeddings 150 may include a vector representation of fixed dimensions, such as a 768-dimensional vector in Bidirectional Encoder Representations from Transformers (BERT).

At block 533, the system 100, 200 may generate a plurality of token type embeddings 160 based on the plurality of tokens 130 and the one or more named entities in the input text 102.

Entities can be distinguished by adding entity-specific token type embeddings 160 to the existing token embeddings 140. For example, the RoBERTa model in Liu et al. (2019) utilizes token types to distinguish between the current sentence and the subsequent sentence in the scenario when there are two sentences. As there is only one sentence in the input text 102 to this model 110, the token types can be repurposed or augmented with entity-specific token types disclosed herein. This can be done by assigning a new token type to every unique entity. Thus, at the input layer of model 110, each entity [E] 120 has a unique type embedding 160.

For example, when a token in the plurality of tokens 130 is not a named entity, the corresponding token type embedding 160 can have a first type value; and when a token in the plurality of tokens 130 is a named entity, the corresponding token type embedding can have a type value that is different from the first type value. Furthermore, each unique named entity within the plurality of tokens 130 has a unique type value for the corresponding token type embedding 160.

As shown in FIG. 1, a first type value, $E_A$, for token type embedding 160 is assigned to tokens (e.g., [CLS], asked, etc.) that are not entities in the plurality of tokens 130. A second type value, $E_B$, for token type embedding 160 is assigned to the first entity marker token [E] which corresponds to the name Ann from the input text 102. A third type value, $E_C$, for token type embedding 160 is assigned to the second entity marker token [E] which corresponds to the name Mary from the input text 102. As Ann and Mary are different (or unique) entities, the respective value for the respective token type embedding 160 is also unique.

Blocks 530, 532 and 533 may be performed concurrently, or one after another, or in parallel, or in combination of any order.

At block 540, the system 100, 200 may process the plurality of token embeddings 140, the plurality of positional embeddings 150, and the plurality of token type embeddings 160 using a transformer neural network model ("the transformer model") 180 to generate a plurality of hidden state vectors h 550, where each hidden state vector corresponds to a respective token of the plurality of tokens 130.

In some embodiments, the plurality of token embeddings 140, the plurality of positional embeddings 150 and the plurality of token type embeddings 160 may be vectors of fixed dimensions, and the input 170 may include a sum of the plurality of token embeddings 140, the plurality of positional embeddings 150 and the plurality of token type embeddings 160. In some embodiments, the plurality of tokens 130 is also input to the transformer model 180.

The transformer architecture or transformer model 180 of N layers is used to process the input 170 and generate a plurality of hidden state vectors: $h_{[CLS]}$, $h_{Ann}$, $h_{asked}$, $h_{Mary}$, $h_{when}$, $h_{she}$, $h_{visited}$, $h_{the}$, $h_{library}$, $h_{[SEP]}$. Each of these hidden state vector 550 may correspond to a respective token in the plurality of tokens 130.

In some embodiments, the transformer model 180 has an encoder block 185, the encoder block comprising a plurality of layers, and each of the plurality of layers includes a multi-head self-attention mechanism and a feed forward network.

In some embodiments, the transformer model 180 is trained based on a masked language modeling to predict masked words in an input sentence.

In some embodiments, the transformer model 180 is trained to optimize a consistency loss $L_c$.

In some embodiments, the consistency loss $L_c$ is based on:

$$L_c=(\mathrm{KL}(P\|Q)+\mathrm{KL}(Q\|P))/2,$$

where P is a probability distribution over a given vocabulary during a forward pass on a training sentence, Q is a probability distribution over the vocabulary during a forward pass on a sentence based on the training sentence with entities in the training sentence replaced with entity markers, and KL is a Kullback-Leibler divergence.

In some embodiments, the transformer model is trained to optimize a semantics loss $L_{sem}$.

In some embodiments, the semantics loss $L_{sem}$ is based on:

$$L_{sem}=\text{MSE}(S1_{CLS},S2_{CLS}),$$

where $S1_{CLS}$ represents a last layer output of the transformer model corresponding to a CLS token for a training sentence, $S2_{CLS}$ represents a last layer output of the transformer model corresponding to a CLS token for a sentence based on the training sentence with entities in the training sentence replaced with entity markers, and MSE is the Mean Squared Error Loss.

In some embodiments, the transformer model 180 is trained to optimize an overall loss based on:

$$L_t=\alpha(\text{MLM}(S1)+\text{MLM}(S2))+\beta L_c+\gamma L_{sem}$$

where α, β and γ are hyperparameters, S1 is a training sentence, $L_c$ is a consistency loss, $L_{sem}$ is a semantics loss, and MLM is a masked language modeling loss.

In some embodiments, the transformer model 180 is trained on a commonsense reasoning downstream task.

In some embodiments, the transformer model 180 is trained on a sentiment analysis downstream task.

Figure 6:
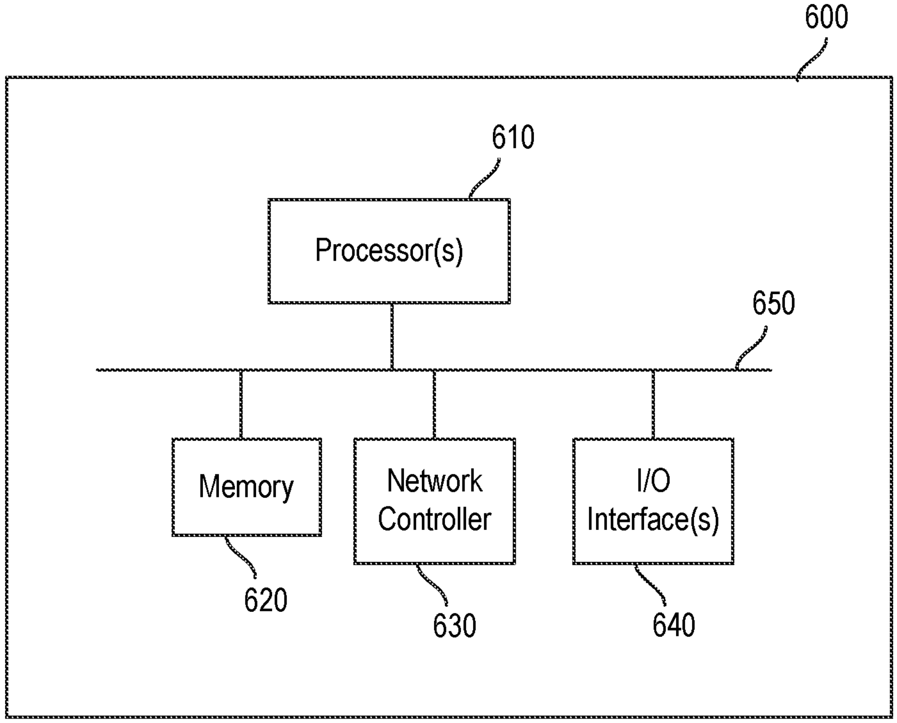
FIG. 6 is a block diagram of example hardware components of a computing device for language modeling, according to an embodiment.

System 100, 200 for language modeling may be implemented as software and/or hardware, for example, in a computing device 600 as illustrated in FIG. 6. Method 500, in particular, one or more of blocks 502 to 510, may be performed by software and/or hardware of a computing device such as computing device 600.

FIG. 6 is a high-level block diagram of computing device 600. Computing device 600, under software control, may train entity-independent language model 110 and use a trained entity-independent language model 110 to model language and generate predictions.

As illustrated, computing device 600 includes one or more processor(s) 610, memory 620, a network controller 630, and one or more I/O interfaces 640 in communication over bus 650.

Processor(s) 610 may be one or more Intel x86, Intel x64, AMD x86-64, PowerPC, ARM processors or the like.

Memory 620 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 630 serves as a communication device to interconnect the computing device with one or more computer networks such as, for example, a local area network (LAN) or the Internet.

One or more I/O interfaces 640 may serve to interconnect the computing device with peripheral devices, such as for example, keyboards, mice, video displays, and the like. Such peripheral devices may include a display of device 600. Optionally, network controller 630 may be accessed via the one or more I/O interfaces.

Software instructions are executed by processor(s) 610 from a computer-readable medium. For example, software may be loaded into random-access memory from persistent storage of memory 620 or from one or more devices via I/O interfaces 640 for execution by one or more processors 610. As another example, software may be loaded and executed by one or more processors 610 directly from read-only memory.

Example software components and data stored within memory 620 of computing device 600 may include software to perform language modeling, as disclosed herein, and operating system (OS) software allowing for basic communication and application operations related to computing device 600.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

The disclosure provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the disclosure, numerous references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

REFERENCES

Samuel R. Bowman, Gabor Angeli, Christopher Potts, and Christopher D. Manning. 2015. A large annotated corpus for learning natural language inference. In *Proceedings of the* 2015 *Conference on Empirical Methods in Natural Language Processing* (*EMNLP*). Association for Computational Linguistics.

Jacob Devlin, Ming-Wei Chang, Kenton Lee, and Kristina Toutanova. 2018. Bert: Pre-training of deep bidirectional transformers for language understanding. *arXiv preprint arXiv:*1810.04805.

Yinhan Liu, Myle Ott, Naman Goyal, Jingfei Du, Mandar Joshi, Danqi Chen, Omer Levy, Mike Lewis, Luke Zettlemoyer, and Veselin Stoyanov. 2019. Roberta: A robustly optimized bert pretraining approach. *arXiv preprint arXiv:*1907.11692.

Arindam Mitra, Ishan Shrivastava, and Chitta Baral. 2019. Understanding roles and entities: Datasets and models for natural language inference, https://arxiv.org/abs/1904.09720.

Jeffrey Pennington, Richard Socher, and Christopher D Manning. 2014. Glove: Global vectors for word representation. In *Proceedings of the* 2014 *conference on empirical methods in natural language processing* (*EMNLP*), pages 1532-1543.

Peng Qi, Yuhao Zhang, Yuhui Zhang, Jason Bolton, and Christopher D Manning. 2020. Stanza: A python natural language processing toolkit for many human languages. *arXiv preprint arXiv:*2003.07082.

Keisuke Sakaguchi, Ronan Le Bras, Chandra Bhagavatula, and Yejin Choi. 2019. Winogrande: An adversarial winograd schema challenge at scale. *arXiv preprint arXiv:*1907.10641.

Vered Shwartz, Rachel Rudinger, and Oyvind Tafjord. 2020. "you are grounded!": Latent name artifacts in pre-trained language models. *arXiv preprint arXiv:*2004.03012.

Paul Trichelair, Ali Emami, Adam Trischler, Kaheer Suleman, and Jackie Chi Kit Cheung. 2018. How reasonable are common-sense reasoning tasks: A case-study on the winograd schema challenge and swag. *arXiv preprint arXiv:*1811.01778.

Ashish Vaswani, Noam Shazeer, Niki Parmar, Jakob Uszkoreit, Llion Jones, Aidan N Gomez, Łukasz Kaiser, and Illia Polosukhin. 2017. Attention is all you need. In *Advances in neural information processing systems*, pages 5998-6008.

What is claimed is:

1. A computer-implemented method for training a computer-implemented language model with entity-independent representation, the method comprising:

receiving an input text;

identifying one or more proper nouns in the input text;

generating entity-marked text based on the input text, wherein generating the entity-marked text includes replacing the identified one or more proper nouns in the input text with one or more entity markers, each of the one or more entity markers corresponding to a respective proper noun in the one or more identified proper nouns;

generating a plurality of token embeddings for the input text and the entity-marked text;

generating a representation of the input text and a representation of the entity-marked text based on the plurality of token embeddings for the input text and the entity-marked text;

inputting the representation of the input text and the representation of the entity-marked text into a computer-implemented language model to train the computer-implemented language model, wherein training the computer-implemented language model includes optimizing a loss function to preserve semantics between the input text and the entity-marked text, wherein the loss function is a function of a semantic error between the input text with the one or more proper nouns and the entity-marked text with the corresponding one or more entity markers, wherein the entity markers and entity-specific token type embeddings are used to learn an entity-independent representation which enables entity swaps and generalization to unseen entities;

and storing the trained computer-implemented language model for downstream tasks.

2. The method of claim 1, wherein each token embedding comprises a vector representation of fixed dimensions for a corresponding string in the input or entity-marked text.

3. The method of claim 1, wherein when a token from the input text or the entity-marked text is not a named entity, the corresponding token type embedding comprises a first type value; wherein when a token from the input text or the entity-marked text is a named entity, the corresponding token type embedding comprises a type value that is different from the first type value; and wherein each unique named entity within the plurality of tokens has a unique type value for the corresponding token type embedding.

4. The method of claim 1, wherein the input text comprises a sentence and each token comprises a word in the sentence.

5. The method of claim 4, comprising parsing the input text into the plurality of tokens, the parsing including:

adding a first token representing a beginning of the sentence before a first word of the sentence;

adding a second token representing an end of the sentence after a last word of the sentence; and generating the plurality of tokens including the first token and the second token.

6. The method of claim 1, wherein the language model includes a transformer model comprising an encoder block, the encoder block comprising a plurality of layers, and each of the plurality of layers comprises a multi-head self-attention mechanism and a feed forward network.

7. The method of claim 6, wherein the transformer model is trained based on a masked language modeling to predict masked words in an input sentence.

8. The method of claim 7, wherein the transformer model is trained to optimize a consistency loss $L_c$.

9. The method of claim 8, wherein the consistency loss $L_c$ is based on:

$$L_c=(KL(P\|Q)+KL(Q\|P))/2,$$

where P is a probability distribution over a vocabulary during a forward pass on a training sentence, Q is a probability distribution over the vocabulary during a forward pass on a sentence based on the training sentence with entities in the training sentence replaced with entity markers, and KL is a Kullback-Leibler divergence.

10. The method of claim 1, wherein the transformer model is trained to optimize a semantics loss $L_{sem}$.

11. The method of claim 10, wherein the semantics loss $L_{sem}$ is based on:

$$L_{sem}=MSE(S1_{CLS},S2_{CLS}),$$

where $S1_{CLS}$ represents a last layer output of the transformer model corresponding to a CLS token for a training sentence, $S2_{CLS}$ represents a last layer output of the transformer model corresponding to a CLS token for a sentence based on the training sentence with entities in the training sentence replaced with entity markers, and MSE is the Mean Squared Error Loss.

12. The method of claim 1, wherein the transformer model is trained to optimize an overall loss based on:

$$L_t=\alpha(MLM(S1)+MLM(S2))+\beta L_c+\gamma L_{sem}$$

where α, β and γ are hyperparameters, S1 is a training sentence, $L_c$ is a consistency loss, $L_{sem}$ is a semantics loss, and MLM is a masked language modeling loss.

13. The method of claim 1, wherein the transformer model is trained on a commonsense reasoning downstream task or a sentiment analysis downstream task.

14. The method of claim 1, comprising: providing at least a portion of a sentence, received via an input field displayed on an electronic display, to the trained computer-implemented language model to generate a predicted next word and displaying the predicted next word on the electronic display.

15. A computer system for training a computer-implemented language model with entity-independent representation, the system comprising:

a processor;

and a memory in communication with the processor, the memory storing instructions that when executed, cause the processor to perform:

receive an input text;

identify one or more proper nouns in the input text;

generate entity-marked text based on the input text, wherein generating the entity-marked text includes replacing the identified one or more named entities in the input text with one or more entity markers, each of the one or more entity markers corresponding to a respective proper noun in the one or more identified proper noun;

generate a plurality of token embeddings for the input text and the entity-marked text:

generate a representation of the input text and a representation of the entity-marked text based on the plurality of token embeddings for the input text and the entity-marked text;

input a representation of the input text and a representation of the entity-marked text into the computer-implemented language model to train the computer-implemented language model, wherein training the computer-implemented language model includes optimizing a loss function to preserve semantics between the input text and the entity-marked text, wherein the loss function is a function of a semantic error between the input text with the one or more proper nouns and the entity-marked text with the corresponding one or more entity markers, wherein the entity markers and entity-specific token type embeddings are used to learn an entity-independent representation which enables entity swaps and generalization to unseen entities;

and store the trained computer-implemented language model for downstream tasks.

16. The system of claim 15, wherein each token embedding comprises a vector representation of fixed dimensions for a corresponding string in the input or entity-marked text.

17. The system of claim 15, wherein when a token from the input text or the entity-marked text is not a named entity, the corresponding token type embedding comprises a first type value; wherein when a token from the input text or the entity-marked text is a named entity, the corresponding token type embedding comprises a type value that is different from the first type value; and wherein each unique named entity within the plurality of tokens has a unique type value for the corresponding token type embedding.

18. The system of claim 15, wherein the input text comprises a sentence and each token comprises a word in the sentence.

19. The system of claim 18, the instructions, when executed, cause the processor to parse the input text into the plurality of tokens, the parsing including:

adding a first token representing a beginning of the sentence before a first word of the sentence;

adding a second token representing an end of the sentence after a last word of the sentence; and generating the plurality of tokens including the first token and the second token.

20. The system of claim 15, wherein the language model includes a transformer model comprising an encoder block, the encoder block comprising a plurality of layers, and each of the plurality of layers comprises a multi-head self-attention mechanism and a feed forward network.

21. The system of claim 20, wherein the transformer model is trained based on a masked language modeling to predict masked words in an input sentence.

22. The system of claim 21, wherein the transformer model is trained to optimize a consistency loss $L_c$.

23. The system of claim 22, wherein the consistency loss $L_c$ is based on:

$$L_c=(KL(P\|Q)+KL(Q\|P))/2,$$

where P is a probability distribution over a vocabulary during a forward pass on a training sentence, Q is a probability distribution over the vocabulary during a forward pass on a sentence based on the training sentence with entities in the training sentence replaced with entity markers, and KL is a Kullback-Leibler divergence.

24. The system of claim 15, wherein the transformer model is trained to optimize a semantics loss $L_{sem}$.

25. The system of claim 24, wherein the semantics loss $L_{sem}$ is based on:

$$L_{sem}=MSE(S1_{CLS},S2_{CLS}),$$

where $S1_{CLS}$ represents a last layer output of the transformer model corresponding to a CLS token for a training sentence, $S2_{CLS}$ represents a last layer output of the transformer model corresponding to a CLS token for a sentence based on the training sentence with entities in the training sentence replaced with entity markers, and MSE is the Mean Squared Error Loss.

26. The system of claim 15, wherein the transformer model is trained to optimize an overall loss based on:

$$L_t=\alpha(\mathrm{MLM}(S1)+\mathrm{MLM}(S2))+\beta L_c+\gamma L_{sem}$$

where α, β and γ are hyperparameters, S1 is a training sentence, $L_c$ is a consistency loss, $L_{sem}$ is a semantics loss, and MLM is a masked language modeling loss.

27. The system of claim 15, wherein the transformer model is trained on a commonsense reasoning downstream task or a sentiment analysis downstream task.

28. The system of claim 15, comprising: providing at least a portion of a sentence, received via an input field displayed on an electronic display, to the trained computer-implemented language model to generate a predicted next word and displaying the predicted next word on the electronic display.

29. A non-transitory computer-readable medium having computer executable instructions stored thereon for execution by one or more computing devices, the instructions, when executed, cause the one or more computing devices to:

receive an input text;

identify one or more proper nouns in the input text;

generate entity-marked text based on the input text, wherein generating the entity-marked text includes replacing the identified one or more named entities in the input text with one or more entity markers, each of the one or more entity markers corresponding to a respective proper noun in the one or more identified proper noun;

generate a plurality of token embeddings for the input text and the entity-marked text;

generate a representation of the input text and a representation of the entity-marked text based on the plurality of token embeddings for the input text and the entity-marked text;

input a representation of the input text and a representation of the entity-marked text into a computer-implemented language model to train the computer-implemented language model, wherein training the computer-implemented language model includes optimizing a loss function to preserve semantics between the input text and the entity-marked text, wherein the loss function is a function of a semantic error between the input text with the one or more proper nouns and the entity-marked text with the corresponding one or more entity markers, wherein the entity markers and entity-specific token type embeddings are used to learn an entity-independent representation which enables entity swaps and generalization to unseen entities;

and store the trained computer-implemented language model for downstream tasks.

* * * * *